United States Patent
Mun et al.

(10) Patent No.: US 10,745,423 B2
(45) Date of Patent: Aug. 18, 2020

(54) MODIFIER, METHOD OF PREPARING THE SAME, AND MODIFIED CONJUGATED DIENE-BASED POLYMER INCLUDING THE SAME

(71) Applicant: LG Chem, Ltd., Seoul (KR)

(72) Inventors: Min Sik Mun, Daejeon (KR); No Ma Kim, Daejeon (KR); Da Won Chai, Daejeon (KR); Ho Young Lee, Daejeon (KR)

(73) Assignee: LG Chem, Ltd. (KR)

( * ) Notice: Subject to any disclaimer, the term of this patent is extended or adjusted under 35 U.S.C. 154(b) by 78 days.

(21) Appl. No.: 15/754,464

(22) PCT Filed: Sep. 5, 2017

(86) PCT No.: PCT/KR2017/009721
§ 371 (c)(1),
(2) Date: Feb. 22, 2018

(87) PCT Pub. No.: WO2018/093027
PCT Pub. Date: May 24, 2018

(65) Prior Publication Data
US 2019/0023725 A1    Jan. 24, 2019

(30) Foreign Application Priority Data

Nov. 21, 2016  (KR) .................. 10-2016-0155265
Jul. 26, 2017  (KR) .................. 10-2017-0094944

(51) Int. Cl.
| | | |
|---|---|---|
| *C07F 7/18* | (2006.01) | |
| *C08C 19/25* | (2006.01) | |
| *C08C 19/20* | (2006.01) | |
| *C08C 19/44* | (2006.01) | |
| *C08C 19/22* | (2006.01) | |
| *C08L 15/00* | (2006.01) | |
| *C08F 236/10* | (2006.01) | |
| *C08F 236/06* | (2006.01) | |
| *C08F 2/06* | (2006.01) | |
| *C08F 236/14* | (2006.01) | |
| *C08K 3/22* | (2006.01) | |

(52) U.S. Cl.
CPC .......... *C07F 7/1804* (2013.01); *C07F 7/1892* (2013.01); *C08C 19/20* (2013.01); *C08C 19/22* (2013.01); *C08C 19/25* (2013.01); *C08C 19/44* (2013.01); *C08F 2/06* (2013.01); *C08F 236/06* (2013.01); *C08F 236/10* (2013.01); *C08F 236/14* (2013.01); *C08L 15/00* (2013.01); *C08F 2800/20* (2013.01); *C08K 2003/2296* (2013.01)

(58) Field of Classification Search
CPC ...... C07F 7/1804; C08F 236/06; C08C 19/25; C08C 19/22
See application file for complete search history.

(56) References Cited

U.S. PATENT DOCUMENTS

| 4,397,994 A | 8/1983 | Takeuchi et al. |
|---|---|---|
| 4,885,338 A | 12/1989 | Takao et al. |
| 2014/0213721 A1 | 7/2014 | Yamada et al. |
| 2016/0053059 A1 | 2/2016 | Kim et al. |

FOREIGN PATENT DOCUMENTS

| EP | 3059257 A1 | | 8/2016 |
|---|---|---|---|
| JP | S52093730 A | | 8/1977 |
| JP | 62 039563 | * | 2/1987 |
| JP | S62039563 A | | 2/1987 |
| JP | S63278946 A | | 11/1988 |
| JP | 2012167215 A | | 9/2012 |
| KR | 101586591 B1 | | 1/2016 |
| WO | 2013035589 A1 | | 3/2013 |

OTHER PUBLICATIONS

JP 62 039563 machine translation (1987).*
Database WPI week 198713 Thomson Scientific, London, GB; AN 1987-089883,Feb. 20, 1987, XP002787826.
Extended European Search Report including Written Opinion for Application No. EP17837928.5 dated Jan. 24, 2019.
Rosenberg et al: "Reactivity of 2-furylethylenes with nucleophilic groups and its biological signifiance", Collection Czechoslovak Chem. Commun., vol. 52, No. 2, pp. 425-430, XP002162908.
Search report from International Search Application No. PCT/KR2017/009721, dated Dec. 18, 2017.

* cited by examiner

*Primary Examiner* — Kuo Liang Peng
(74) *Attorney, Agent, or Firm* — Lerner, David, Littenberg, Krumholz & Mentlik, LLP

(57) ABSTRACT

The present disclosure relates to a modifier, and more particularly, to a modifier including a compound represented by Formula 1, and a method of preparing the same. Such modifier exhibits excellent dispersibility via hydrogen bonding with an inorganic filler when mixed therewith. The present disclosure also relates to a modified conjugated diene-based polymer modified using the modifier and thus exhibiting excellent processability, high tensile strength, high wear resistance, low rolling resistance, and high wet skid resistance, and a method of preparing the modified conjugated diene-based polymer.

17 Claims, No Drawings

MODIFIER, METHOD OF PREPARING THE SAME, AND MODIFIED CONJUGATED DIENE-BASED POLYMER INCLUDING THE SAME

CROSS-REFERENCE TO RELATED APPLICATIONS

The present application is a national phase entry under 35 U.S.C. § 371 of International Application No. PCT/KR2017/009721, which claims priority from Korean Patent Application Nos. 10-2016-0155265, filed on Nov. 21, 2016, and 10-2017-0094944, filed on Jul. 26, 2017, the disclosures of which are incorporated herein by reference in their entirety.

TECHNICAL FIELD

The present invention relates to a modifier, and more particularly, to a modifier having excellent interactions with a rubber polymer and an inorganic filler, a method of preparing the same, and a modified conjugated diene-based polymer that includes a functional group derived from the modifier and thus exhibits excellent processability, high tensile strength, high wear resistance, low rolling resistance, and high wet skid resistance.

BACKGROUND ART

According to the recent requirement for automobiles to be fuel-efficient, conjugated diene-based polymers, which have low rolling resistance, high wear resistance, excellent tensile properties, and handling stability represented as wet skid resistance, are required as a rubber material for tires.

To reduce the rolling resistance of tires, there is a method of decreasing the hysteresis loss of vulcanized rubber. As evaluation standards of such vulcanized rubber, repulsive elasticity at 50° C. to 80° C., tan δ, Goodrich heating, and the like are used. That is, rubber materials with high repulsive elasticity at the above-described temperature range or low tan δ and Goodrich heating are preferably used.

As rubber materials having a low hysteresis loss, natural rubber, polyisoprene rubber, polybutadiene rubber, and the like are known, but these materials have low wet skid resistance. Thus, conjugated diene-based polymers or copolymers such as styrene-butadiene rubber (SBR) or butadiene rubber (BR), prepared by emulsion polymerization or solution polymerization, have recently been used as rubber for tires. Among these, the biggest advantage of solution polymerization over emulsion polymerization is that the contents of a vinyl structure and styrene, which determine physical properties of rubber, may be arbitrarily adjusted, and molecular weights, physical properties, and the like may be adjusted by coupling, modification, or the like. Thus, SBR prepared by solution polymerization through which it is easy to structurally change the finally prepared SBR or BR, movement of chain ends may be decreased by binding or modifying the chain ends, and binding strength of SBR with a filler such as silica, carbon black, or the like is increased is widely being used as a rubber material for tires.

When such solution-polymerized SBR is used as a rubber material for tires, a glass transition temperature of rubber may be increased by increasing a vinyl content in the SBR, and thus physical characteristics required for tires, such as driving resistance and braking force, may be adjusted, and fuel consumption may also be reduced by appropriately adjusting the glass transition temperature. The solution-polymerized SBR is prepared using an anionic polymerization initiator, and chain ends of the formed polymer are bound using various modifiers or are modified. For example, U.S. Pat. No. 4,397,994 discloses a technology for binding active anions of chain ends of a polymer, obtained by polymerizing styrene-butadiene in a non-polar solvent using alkyllithium as a mono-functional initiator, using a binder such as a tin compound.

Meanwhile, carbon black, silica, and the like are used as a reinforcing filler of tire treads. When silica is used as a reinforcing filler, low hysteresis loss and wet skid resistance are improved. However, silica with a hydrophilic surface has a lower affinity with rubber than that of carbon black with a hydrophobic surface, and thus has a problem such as poor dispersibility. Thus, it is necessary to use a separate silane coupling agent to enhance the dispersibility of silica and enable binding between silica and rubber. Thus, studies on the introduction of functional groups with affinity or reactivity with silica to an end of rubber molecules have been conducted, but an effect thereof is insufficient.

PRIOR ART REFERENCE

Patent Document (Patent Document 1) U.S. Pat. No. 4,397,994 A

DISCLOSURE

Technical Problem

The present invention has been made in view of the above problems, and it is an object of the present invention to provide a modifier exhibiting excellent dispersibility via hydrogen bonding with an inorganic filler when mixed therewith, a method of preparing the same, a modified conjugated diene-based polymer modified by the modifier and thus exhibiting excellent processability, high tensile strength, high wear resistance, low rolling resistance, and high wet skid resistance, and a method of preparing the modified conjugated diene-based polymer.

Technical Solution

According to an embodiment of the present invention in order to solve the above object, the present invention provides a modifier including a compound represented by Formula 1 below:

<Formula 1> wherein, in Formula 1, $R^1$ may be deuterium, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, or a substituted or unsubstituted $C_3$-$C_{30}$ heterocyclic group; $R^2$ may be deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1a below; $R^3$ may be deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1b below, wherein, when IV, $R^2$, and $R^3$ are the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group, a substituent of the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group comprises one or more selected from the group consisting of deuterium, a halogen, a hydroxyl group, a nitro group, a cyano group, a $C_1$-$C_{30}$ alkyl group, a $C_1$-$C_{30}$ alkylsilyl group, a $C_2$-$C_{30}$ alkenyl group, a $C_2$-$C_{30}$ alkynyl group, a $C_1$-$C_{30}$ alkoxy group, a substituted or unsubstituted $C_1$-$C_{30}$ heteroalkyl group, a $C_5$-$C_{30}$ cycloalkyl group, a $C_6$-$C_{30}$ aryl group, and a $C_3$-$C_{30}$ heterocyclic group; and X may be one heteroatom selected from the group consisting of nitrogen (N), oxygen (O), and sulfur (S), wherein, when X is N, at least one of $R^2$ and $R^3$ may be necessarily the functional group of Formula 1a or 1b, and, when X is O or S, only one of the $R^2$ and $R^3$ functional groups is present, wherein, when $R^2$ is present, $R^2$ may be the functional group of Formula 1a, and, when $R^3$ is present, $R^3$ may be the functional group of Formula 1b, <Formula 1a>

$$\{\!\!- R^4 - Si(OR^5)_n(R^6)_{3-n}$$

<Formula 1b>

$$\{\!\!- R^7 - Si(OR^8)_m(R^9)_{3-m}$$

wherein, in Formulae 1a and 1b, $R^4$ and $R^7$ may be each independently a $C_1$-$C_{10}$ alkylene group, $R^5$, $R^6$, $R^8$, and $R^9$ may be each independently a $C_1$-$C_{30}$ alkyl group, a $C_5$-$C_{30}$ cycloalkyl group, or a $C_6$-$C_{30}$ aryl group, m and n may be each independently an integer selected from 0, 1, 2, and 3, wherein m+n≥1, and, when only one of the functional groups of Formulae 1a and 1b is present, m or n may be each independently an integer selected from 1, 2, and 3.

In addition, the present invention provides a method of preparing a modifier, the method including reacting a compound represented by Formula 2 below with a compound represented by Formula 3 below:

<Formula 2>

$$R^1 \diagup\!\!\!\diagdown NO_2$$

<Formula 3>

$$HX \diagdown_{R^3}^{R^2}$$

wherein each of the substituents in Formulae 2 and 3 is the same as defined in Formula 1 above.

The present invention also provides a modified conjugated diene-based polymer including a functional group derived from the modifier and a method of preparing the same.

Advantageous Effects

According to the present invention, when a conjugated diene-based polymer is modified with a modifier exhibiting excellent dispersibility via hydrogen bonding with an inorganic filler when mixed therewith, the resulting polymer has a functional group derived from the modifier at one terminal thereof, and thus a modified conjugated diene-based polymer exhibiting excellent interaction with the inorganic filler due to hydrogen bonding therewith can be prepared, and the prepared modified conjugated diene-based polymer has excellent processability, high tensile strength, high wear resistance, low rolling resistance, and high wet skid resistance.

BEST MODE

Hereinafter, the present invention will be described in more detail to aid in understanding of the present invention.

The terms or words used in the present specification and claims should not be construed as being limited to ordinary or dictionary meanings and should be construed as meanings and concepts consistent with the spirit of the present invention based on a principle that an inventor can appropriately define concepts of terms to explain the invention of the inventor in the best way.

A modifier according to the present invention may include a compound represented by Formula 1 below:

<Formula 1> wherein, in Formula 1, $R^1$ may be deuterium, a substituted or unsubstituted alkyl group, a substituted or unsubstituted $C_2$-$C_{30}$ alkenyl group, a substituted or unsubstituted $C_2$-$C_{30}$ alkynyl group, a substituted or unsubstituted heteroalkyl group, a substituted or unsubstituted $C_5$-$C_{30}$ cycloalkyl group, a substituted or unsubstituted $C_6$-$C_{30}$ aryl group, or a substituted or unsubstituted $C_3$-$C_{30}$ heterocyclic group; $R^2$ may be deuterium, a substituted or unsubstituted $C_1$-$C_{30}$ alkyl group, a substituted or unsubstituted alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1a below; $R^3$ may be deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1b below, wherein, when IV, $R^2$, and $R^3$ are the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group, a substituent of the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group may be one or more selected from the group consisting of deuterium, a halogen, a hydroxyl group, a nitro group, a cyano group, a $C_1$-$C_{30}$ alkyl group, a $C_1$-$C_{30}$ alkylsilyl group, a $C_2$-$C_{30}$ alkenyl group, a $C_2$-$C_{30}$ alkynyl group, a $C_1$-$C_{30}$ alkoxy group, a substituted or unsubstituted $C_1$-$C_{30}$ heteroalkyl group, a $C_5$-$C_{30}$ cycloalkyl group, a $C_6$-$C_{30}$ aryl group, and a $C_3$-$C_{30}$ heterocyclic group; and X may be one heteroatom selected from the group consisting of nitrogen (N), oxygen (O), and sulfur (S), wherein, when X is N, at least one of $R^2$ and $R^3$ may be necessarily the functional group of Formula 1a or 1b below, and, when X is O or S, only one of the $R^2$ and $R^3$ functional groups is present, wherein, when $R^2$ is present, $R^2$ may be the functional group of Formula 1a below, and, when $R^3$ is present, $R^3$ may be the functional group of Formula 1b below,

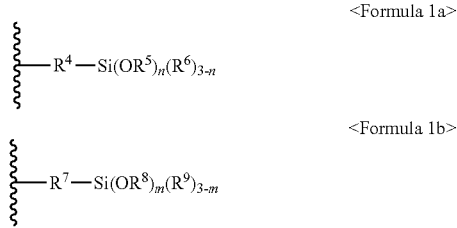

<Formula 1a>

<Formula 1b> wherein, in Formulae 1a and 1b, $R^4$ and $R^7$ may be each independently a $C_1$-$C_{10}$ alkylene group; $R^5$, $R^6$, $R^8$, and $R^9$ may be each independently a $C_1$-$C_{30}$ alkyl group, a $C_5$-$C_{30}$ cycloalkyl group, or a $C_6$-$C_{30}$ aryl group; m and n may be each independently an integer selected from 0, 1, 2, and 3, wherein m+n≥1; and, when only one of the functional groups of Formulae 1a and 1b is present, m or n may be each independently an integer selected from 1, 2, and 3.

In particular, in Formula 1, $R^1$ may be a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ heteroalkyl group, a substituted or unsubstituted $C_5$-$C_{20}$ cycloalkyl group, a substituted or unsubstituted $C_6$-$C_{20}$ aryl group, or a substituted or unsubstituted $C_3$-$C_{20}$ heterocyclic group; $R^2$ may be the functional group of Formula 1a; $R^3$ may be the functional group of Formula 1b; when $R^1$ is the substituted alkyl group, the substituted alkenyl group, the substituted alkynyl group, the substituted heteroalkyl group, the substituted cycloalkyl group, the substituted aryl group, or the substituted heterocyclic group, the substituent of the substituted alkyl group, the substituted alkenyl group, the substituted alkynyl group, the substituted heteroalkyl group, the substituted cycloalkyl group, the substituted aryl group, or the substituted heterocyclic group may be one or more selected from the group consisting of deuterium, a halogen, a hydroxyl group, a nitro group, a cyano group, a $C_1$-$C_{30}$ alkyl group, a $C_1$-$C_{30}$ alkylsilyl group, a $C_2$-$C_{30}$ alkenyl group, a $C_2$-$C_{30}$ alkynyl group, a $C_1$-$C_{30}$ alkoxy group, a substituted or unsubstituted $C_1$-$C_{30}$ heteroalkyl group, a $C_5$-$C_{30}$ cycloalkyl group, a $C_6$-$C_{30}$ aryl group, and a $C_3$-$C_{30}$ heterocyclic group; and X may be one heteroatom selected from the group consisting of N, O, and S, wherein, when X is O or S, only one of the $R^2$ and $R^3$ functional groups may be present.

In Formulae 1a and 1b, $R^4$ and $R^7$ may be each independently a $C_1$-$C_5$ alkylene group; $R^5$, $R^6$, $R^8$, and $R^9$ may be each independently a $C_1$-$C_{20}$ alkyl group, a $C_5$-$C_{20}$ cycloalkyl group, or a $C_6$-$C_{20}$ aryl group; m and n may be each independently an integer selected from 1, 2, and 3.

The term "substituted" as used herein may mean that hydrogen of a functional group, an atomic group, or a compound is substituted with a particular substituent. When the hydrogen of a functional group, an atomic group, or a compound is substituted with a particular substituent, a single substituent or two or more substituents may be present according to the number of hydrogens existing in a functional group, an atomic group, or a compound. When the two or more substituents are present, the substituents may be identical to or different from each other.

The term "alkyl group" as used herein may refer to a monovalent aliphatic saturated hydrocarbon, and may mean as including both linear alkyl groups such as methyl, ethyl, propyl, butyl, and the like, and branched alkyl groups such as isopropyl, sec-butyl, tert-butyl, neopentyl, and the like.

The term "alkylene group" as used herein may refer to a divalent aliphatic saturated hydrocarbon such as methylene, ethylene, propylene, butylene, and the like.

The term "alkylsilyl group" as used herein may mean as including monoalkylsilyl, dialkylsilyl, and trialkylsilyl.

The term "alkenyl group" as used herein may refer to an alkyl group containing a single double bond or two or more double bonds.

The term "alkynyl group" as used herein may refer to an alkyl group containing a single triple bond or two or more triple bonds.

The term "alkoxy group" as used herein may mean as including a functional group, an atomic group, or a compound in which hydrogen at a terminal of an alkyl group is substituted with oxygen atom, such as methoxy, ethoxy, propoxy, butoxy, and the like.

The term "heteroalkyl group" as used herein may refer to an alkyl group, carbon atom (except for carbon atom at the terminal) of which is substituted with one or more heteroatoms.

The term "cycloalkyl group" as used herein may mean as including a cyclic saturated hydrocarbon or a cyclic unsaturated hydrocarbon containing one or more unsaturated bonds.

The term "aryl group" as used herein may mean as including a cyclic aromatic hydrocarbon and also including both a monocyclic aromatic hydrocarbon having one ring and a polycyclic aromatic hydrocarbon having two or more rings bounded thereto.

The term "aralkyl group" as used herein may refer to an alkyl group in which one or more aryl groups are necessarily substituted.

The term "heterocyclic group" as used herein may mean as including a cycloalkyl group or an aryl group, carbon atom of which is substituted with one or more heteroatoms.

According to one embodiment of the present invention, the compound of Formula 1 may be a compound represented by one of Formulae 1-1 to 1-12 below.

<Formula 1-1>
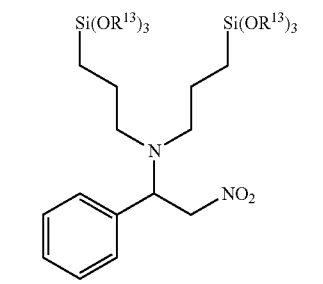

<Formula 1-2>
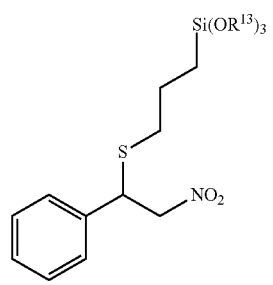

<Formula 1-3>
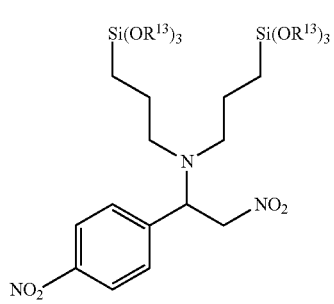

<Formula 1-4>
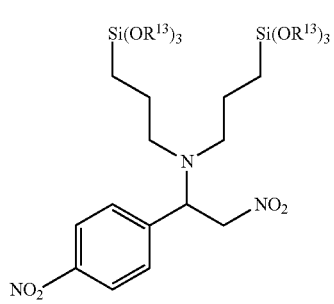

<Formula 1-5>
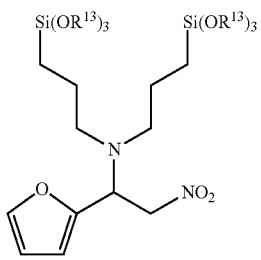

<Formula 1-6>
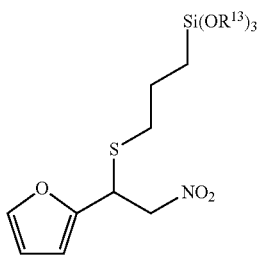

<Formula 1-7>
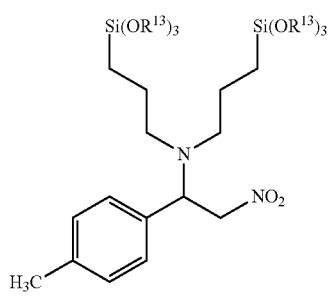

<Formula 1-8>
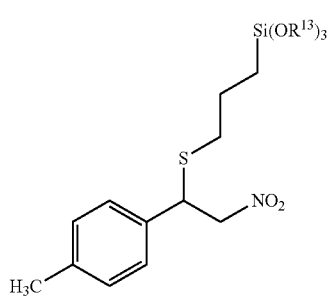

<Formula 1-9>
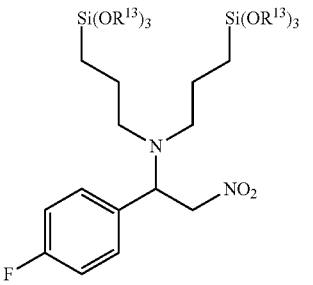

-continued

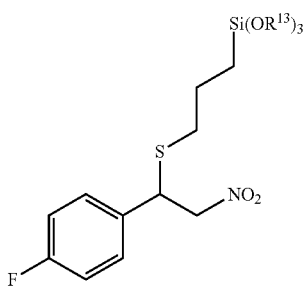
<Formula 1-10>

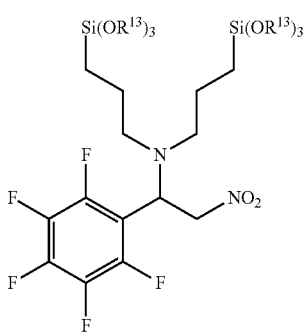
<Formula 1-11>

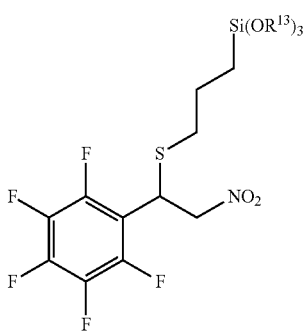
<Formula 1-12>

In Formulae 1-1 to 1-12, $R^{13}$ is a $C_1$-$C_{20}$ alkyl group, preferably, a methyl group or an ethyl group.

Although all the compounds of Formulae 1-1 to 1-12 are represented as containing a trialkoxysilyl group, according to the present invention, the trialkoxysilyl group may be substituted with a silyl functional group substituted by appropriately combining the number of alkyl groups and the number of alkoxy groups according to need, such as alkyldimethoxysilyl, alkyldiethoxysilyl, dialkylmethoxysilyl, dialkylethoxysilyl, and the like.

The modifier of the present invention includes a compound containing —NO$_2$ in the molecule, and thus enables hydrogen bonding between oxygen atom of —NO$_2$ and hydrogen atom bound to —OH or the like present at a surface of an inorganic filler, in particular, a silica-based filler, thereby having stronger interaction with such a filler. Accordingly, dispersibility between a polymer modified by the modifier and a filler may be enhanced.

A method of preparing a modifier according to the present invention may include reacting a compound represented by Formula 2 below with a compound represented by Formula 3 below:

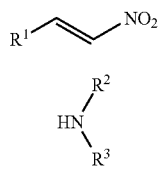
<Formula 2>

<Formula 3> wherein each of the substituents in Formulae 2 and 3 is the same as defined in Formula 1 above.

The compound of Formula 2 may be, for example, a compound represented by one of Formulae 2-1 to 2-6 below.

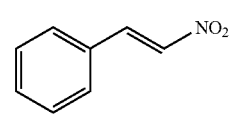
<Formula 2-1>

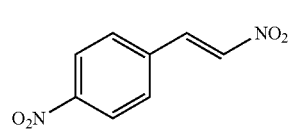
<Formula 2-2>

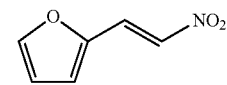
<Formula 2-3>

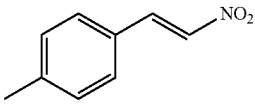
<Formula 2-4>

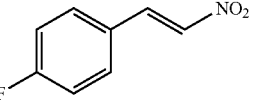
<Formula 2-5>

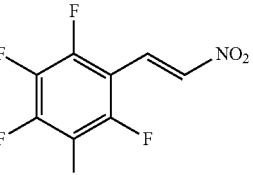
<Formula 2-6>

In another embodiment, the compound of Formula 3 may be a compound represented by one of Formulae 3-1 to 3-6 below.

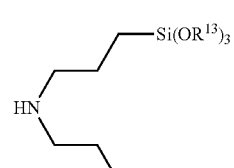
<Formula 3-1>

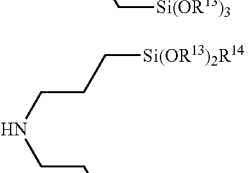
<Formula 3-2>

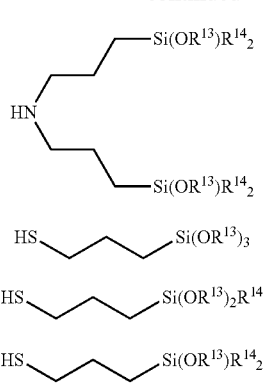

<Formula 3-3>

<Formula 3-4>

<Formula 3-5>

<Formula 3-6>

In Formulae 3-1 to 3-6, $R^{13}$ is $C_1$-$C_{20}$ alkyl group, preferably, a methyl group or an ethyl group, and $R^{14}$ is a $C_1$-$C_{20}$ alkyl group, preferably, a methyl group or an ethyl group.

In particular, the alkoxysilyl group may be substituted with a silyl functional group substituted by appropriately combining the number of alkyl groups and the number of alkoxy groups according to need, such as triethoxysilyl, trimethoxysilyl, alkyldimethoxysilyl, alkyldiethoxysilyl, dialkylmethoxysilyl, dialkylethoxysilyl, and the like.

In another embodiment, the compounds of Formulae 3-1 to 3-6 may be compounds represented by Formulae 3-7 to 3-12, respectively.

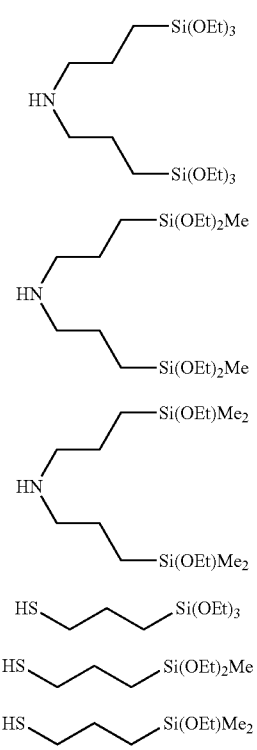

<Formula 3-7>

<Formula 3-8>

<Formula 3-9>

<Formula 3-10>

<Formula 3-11>

<Formula 3-12>

In Formulae 3-7 to 3-12, Me is a methyl group, and Et is an ethyl group.

Meanwhile, a molar ratio (Formula 2:Formula 3) of the compound of Formula 2 to the compound of Formula 3 may range from 0.5 moles to 2 moles, 0.7 moles to 1.5 moles, or 0.9 moles to 1.1 moles of the compound of Formula 3 based on 1 mole of the compound of Formula 2.

In other words, the molar ratio of the compound of Formula 2 to the compound of Formula 3 may range from 1:0.5 to 1:2, 1:0.7 to 1:1.5, or 1:0.9 to 1:1.1. When the molar ratio thereof is within the range, excellent purity and yield may be obtained.

According to one embodiment of the present invention, the reacting may be performed at a reaction temperature ranging from 10° C. to 90° C., 20° C. to 80° C., or 20° C. to 60° C. When the reaction temperature is within the above range, a reaction rate is high and a reaction product may have high purity and high yield.

In another embodiment, the reaction may be performed in the presence of a basic compound. In this case, protons of the compound of Formula 3 are removed by the basic compound, and then an addition reaction, in which the anionized X group is added to a double bond of the compound of Formula 2, occurs, resulting in excellent reaction rate. The basic compound may be, for example, one or more selected from the group consisting of methylamine, dimethylamine, triethylamine, tetramethylethylenediamine, lithiumdiisopropylamide, 1,8-diazabicycloundec-7-ene, 2,6-di-tert-butylpyridine, and lithiumtetramethylpiperidine.

A modified conjugated diene-based polymer according to the present invention may include a repeating unit derived from a conjugated diene-based monomer, and may include, at one terminal thereof, a functional group derived from a modifier including a compound represented by Formula 1 below.

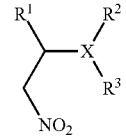

<Formula 1>

Each of the substituents in Formula 1 is the same as defined above.

The repeating unit derived from a conjugated diene-based monomer may mean a repeating unit formed when the conjugated diene-based monomer is polymerized, and the conjugated diene-based monomer may be, for example, one or more selected from the group consisting of 1,3-butadiene, 2,3-dimethyl-1,3-butadiene, piperylene, 3-butyl-1,3-octadiene, isoprene, 2-phenyl-1,3-butadiene, and 2-halo-1,3-butadiene (wherein halo denotes a halogen atom).

Meanwhile, the modified conjugated diene-based polymer may be, for example, a copolymer further including a repeating unit derived from an aromatic vinyl monomer in addition to the repeating unit derived from a conjugated diene-based monomer.

The repeating unit derived from an aromatic vinyl monomer may mean a repeating unit formed when the aromatic vinyl monomer is polymerized, and the aromatic vinyl monomer may be, for example, one or more selected from the group consisting of styrene, α-methylstyrene, 3-methylstyrene, 4-methylstyrene, 4-propylstyrene, 1-vinylnaphthalene, 4-cyclohexylstyrene, 4-(p-methylphenyl)styrene, and 1-vinyl-5-hexylnaphthalene.

When the modified conjugated diene-based polymer is the copolymer further including a repeating unit derived from an aromatic vinyl monomer, the modified conjugated diene-based polymer may include 50 wt % to 95 wt %, 55 wt % to 90 wt %, or 60 wt % to 90 wt % of the repeating unit derived from a conjugated diene-based monomer and 5 wt % to 50 wt %, 10 wt % to 45 wt %, or 10 wt % to 40 wt % of the repeating unit derived from an aromatic vinyl monomer. When the contents of the repeating units are within the above ranges, the modified conjugated diene-based polymer may have low rolling resistance, high wet skid resistance, and high wear resistance.

According to one embodiment of the present invention, the copolymer may be a random copolymer, and in this case, an excellent balance between physical properties thereof is obtained. The random copolymer may refer to a copolymer having repeating units randomly arranged.

Meanwhile, the modified conjugated diene-based polymer may include a functional group derived from a modification initiator including a compound represented by Formula 4 below at another terminal thereof, in addition to the functional group derived from a modifier including the compound of Formula 1 at one terminal thereof.

<Formula 4>

In Formula 4, $R^{10}$ and $R^{11}$ may be each independently one selected from the group consisting of a $C_1$-$C_{20}$ alkyl group, a $C_3$-$C_{20}$ cycloalkyl group, and a $C_5$-$C_{20}$ aralkyl group, or may be linked to each other to form a saturated or unsaturated cyclic structure with 5 to 20 carbon atoms together with N atom, wherein, when forming a cyclic structure, $R^{10}$ and $R^{11}$ may have a branched structure optionally; $R^{12}$ may be a single bond, a $C_1$-$C_{20}$ alkylene group, or one selected from the group consisting of linkers represented by Formulae 5 to 7 below; and M may be an alkali metal.

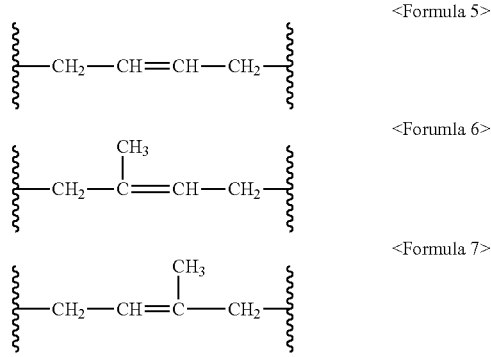

<Formula 5>

<Forumla 6>

<Formula 7>

In particular, in Formula 4, $R^{10}$ and $R^{11}$ may be each independently one selected from the group consisting of a $C_1$-$C_{12}$ alkyl group, a $C_3$-$C_{14}$ cycloalkyl group, and a $C_5$-$C_{20}$ aralkyl group, $R^{12}$ may be a single bond, a $C_1$-$C_{20}$ alkylene group, or one selected from the group consisting of the linkers of Formulae 5 to 7, and M may be an alkali metal.

More particularly, in Formula 4, $R^{10}$ and $R^{11}$ may be each independently methyl, ethyl, propyl, butyl, octyl, cyclopropyl, cyclohexyl, 3-phenyl-1-propyl, isobutyl, decyl, heptyl, or phenyl, $R^{12}$ may be a single bond, a $C_2$-$C_{16}$ alkylene group, or one selected from the group consisting of the linkers of Formulae 3 to 5, and M may be lithium (Li).

The functional group derived from a modification initiator including the compound of Formula 4 is a polymerization initiator for initiating the polymerization of a conjugated diene-based polymer and may refer to a functional group in the polymer positioned at one terminal of the conjugated diene-based polymer. When the modification initiator is used, a conjugated diene-based polymer with enhanced dispersibility and processability and improved mechanical and physical properties in terms of rolling resistance, wet skid resistance, and the like may be prepared.

The modified conjugated diene-based polymer according to one embodiment of the present invention may have a number average molecular weight (Mn) of 10,000 g/mol to 2,000,000 g/mol, 50,000 g/mol to 1,800,000 g/mol, or 120,000 g/mol to 1,500,000 g/mol, and may have a weight average molecular weight (Mw) of 10,000 g/mol to 5,000,000 g/mol, 100,000 g/mol to 3,500,000 g/mol, or 120,000 g/mol to 2,000,000 g/mol. When the number average molecular weight (Mn) and the weight average molecular weight (Mw) of the modified conjugated diene-based polymer are within the above ranges, low rolling resistance and high wet skid resistance are obtained. In another embodiment, a molecular weight ratio (Mw/Mn) of the modified conjugated diene-based polymer may range from 1.0 to 8.0, 1.0 to 4.0, or 1.0 to 3.5. When the molecular weight ratio (Mw/Mn) thereof is within the above range, an excellent balance between physical properties thereof is obtained.

In another embodiment, the modified conjugated diene-based polymer may have a Mooney viscosity of 20 to 150 at 100° C. and 20 to 150 at 140° C. When the Mooney viscosity thereof is within the above ranges, excellent processability and productivity are obtained.

In addition, the modified conjugated diene-based polymer may have a vinyl content of 5 wt % or more, 10 wt % or more, or 14 wt % to 70 wt %. When the vinyl content thereof is within the above range, a glass transition temperature thereof may be appropriately adjusted, and thus low rolling resistance, high wet skid resistance, and high fuel efficiency are obtained. In this regard, the vinyl content may refer to the amount of a 1,2-added conjugated diene-based monomer, not the amount of a 1,4-added conjugated diene-based monomer, with respect to 100 wt % of a conjugated diene-based copolymer consisting of a vinyl group-containing monomer and an aromatic vinyl-based monomer.

Meanwhile, the terms "repeating unit derived" and "functional group derived" as used herein may refer to a component or structure derived from a material or the material itself.

A method of preparing a modified conjugated diene-based polymer, according to the present invention, may include: preparing an active polymer with an organic metal bound thereto by polymerizing a conjugated diene-based monomer, or an aromatic vinyl-based monomer and a conjugated diene-based monomer, in a hydrocarbon solvent including an organometallic compound (S1); and reacting the active polymer with a modifier including a compound represented by Formula 1 below (S2).

<Formula 1>

Each of the substituents in Formula 1 is the same as defined above.

The hydrocarbon solvent is not particularly limited, and may be, for example, one or more selected from the group consisting of n-pentane, n-hexane, n-heptane, isooctane, cyclohexane, toluene, benzene, and xylene.

According to one embodiment of the present invention, the compound of Formula 1 may be used in an amount of 0.01 mmol to 10 mmol, 0.01 mmol to 5 mmol, or 0.02 mmol to 3 mmol, based on 100 g (total) of the monomer.

According to one embodiment of the present invention, the organometallic compound may be used in an amount of 0.01 mmol to 10 mmol, 0.05 mmol to 5 mmol, 0.1 mmol to 2 mmol, or 0.1 mmol to 1 mmol, based on 100 g (total) of the monomer.

The organometallic compound may be, for example, one or more selected from the group consisting of methyllithium, ethyllithium, propyllithium, n-butyllithium, s-butyllithium, t-butyllithium, hexyllithium, n-decyllithium, t-octyllithium, phenyllithium, 1-naphthyllithium, n-eicosyllithium, 4-butylphenyllithium, 4-tolyllithium, cyclohexyllithium, 3,5-di-n-heptylcyclohexyllithium, 4-cyclopentyllithium, naphthyl sodium, naphthyl potassium, lithium alkoxide, sodium alkoxide, potassium alkoxide, lithium sulfonate, sodium sulfonate, potassium sulfonate, lithium amide, sodium amide, potassium amide, and lithium isopropylamide.

In another embodiment, the organometallic compound may be a compound represented by Formula 4 below:

<Formula 4> wherein each of the substituents in Formula 4 is the same as defined above.

Meanwhile, the polymerizing of process S1 may be performed by including a polar additive, and the polar additive may be added in an amount of 0.001 g to 50 g, 0.001 g to 10 g, or 0.005 g to 0.1 g based on 100 g (total) of the monomer. In addition, the polar additive may be one or more selected from the group consisting of tetrahydrofuran, ditetrahydrofurylpropane, diethylether, cycloamylether, dipropylether, ethylenemethylether, ethylenedimethylether, diethylglycol, dimethylether, tert-butoxyethoxyethane, bis(3-dimethylaminoethyl)ether, (dimethylaminoethyl)ethylether, trimethylamine, triethylamine, tripropylamine, and tetramethylethylenediamine Preferably, the polar additive may be triethylamine or tetramethylethylenediamine, and may be identical to or different from a polar additive that may be added in preparation of an aminosilane-based compound. In a case in which the polar additive is included, when the conjugated diene-based monomer, or the conjugated diene-based monomer and the aromatic vinyl-based monomer are copolymerized, a difference between reaction rates thereof may be compensated for such that easy formation of a random copolymer is induced.

In process S1, the polymerization may be, for example, anionic polymerization. Specifically, the polymerization may be living anionic polymerization in which a polymerized end has an anion active site through a growth polymerization reaction by anions. In addition, the polymerization in process S1 may be heating polymerization, isothermal polymerization, or room-temperature polymerization (adiabatic polymerization). The room-temperature polymerization may refer to a polymerization method including performing polymerization with a reaction heat itself without arbitrarily applying heat after the organometallic compound is added, the heating polymerization may refer to a polymerization method in which the organometallic compound is added and then heat is applied to increase the reaction temperature, and the isothermal polymerization may refer to a polymerization method in which the organometallic compound is added and then heat is applied thereto to increase the temperature or take heat away therefrom to constantly maintain the temperature of the polymerized product. In addition, the polymerizing of process S1 may be performed at a temperature ranging from, for example, −20° C. to 200° C., 0° C. to 150° C., or 10° C. to 120° C.

The active polymer prepared by process S1 may mean a polymer having anions bound to cations of the organic metal.

According to one embodiment of the present invention, a molar ratio of the modifier including the compound of Formula 1 to the organometallic compound may range from 1:0.1 to 1:10, 1:0.1 to 1:5, or 1:0.2 to 1:3. When the molar ratio thereof is within the above range, a modification reaction may be optimally performed, and thus a conjugated diene-based polymer with a high modification rate may be obtained.

The reacting of process S2 is a modification reaction for introducing a functional group derived from the modifier to the active polymer, and may be performed at a temperature of 0° C. to 90° C. for 1 minute to 5 hours.

In addition, according to one embodiment of the present invention, the method of preparing a modified conjugated diene-based polymer may be performed by a batch-type polymerization method or a continuous-type polymerization method including one or more reactors.

The method of preparing a modified conjugated diene-based polymer may further include, for example, one or more processes selected from recovering and drying a solvent and unreacted monomers according to need, after process S2 of the present invention.

The present invention also provides a rubber composition including the above-described modified conjugated diene-based polymer.

The rubber composition may include 10 wt % or more, 10 wt % to 100 wt %, or 20 wt % to 90 wt % of the modified conjugated diene-based polymer. When the modified conjugated diene-based polymer is included in the above-described amount range, excellent mechanical and physical properties in terms of tensile strength, wear resistance, and the like, and an excellent balance between the physical properties may be obtained.

In addition, the rubber composition may further include other rubber components as necessary, in addition to the modified conjugated diene-based polymer, and the rubber components may be included in an amount of 90 wt % or less with respect to the total weight of the rubber composition. In particular, the other rubber components may be included in an amount of 1 part by weight to 900 parts by weight with respect to 100 parts by weight of the modified conjugated diene-based polymer.

The rubber component may be, for example, a natural rubber or synthetic rubber, and examples of such rubber components include: a natural rubber (NR) including cis-1,4-polyisoprene; a modified NR obtained by modifying or purifying such general NR, such as epoxidized NR (ENR), deproteinized NR (DPNR), hydrogenated NR, and the like; and a synthetic rubber such as a styrene-butadiene rubber (SBR) copolymer, polybutadiene rubber (BR), polyisoprene rubber (IR), butyl rubber (IIR), an ethylene-propylene copolymer, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acryl rubber, urethane rubber, silicone rubber, epichlorohydrin rubber, butyl rubber, halogenated butyl rubber, and the like. Any one selected from the above-listed materials or a mixture of two or more of these materials may be used.

The rubber composition may include a filler, for example, in an amount of 0.1 parts by weight to 200 parts by weight, or 10 parts by weight to 120 parts by weight, with respect to 100 parts by weight of the modified conjugated diene-based polymer of the present invention. The filler may be, for example, a silica-based filler, and, in particular, the silica-based filler may be wet silica (hydrous silicic acid), dry silica (anhydrous silicic acid), calcium silicate, aluminum silicate, colloidal silica, or the like. Preferably, the filler may be wet silica having both the most significant improvement effect on fracture properties and the most significant wet gripping effect. In addition, the rubber composition may further include a carbon black-based filler as necessary.

In another embodiment, when silica is used as the filler, a silane coupling agent may be used therewith to improve reinforcing properties and low exothermicity. In particular, the silane coupling agent may be bis(3-triethoxysilylpropyl)tetrasulfide, bis(3-triethoxysilylpropyl)trisulfide, bis(3-triethoxysilylpropyl)disulfide, bis(2-triethoxysilylethyl)tetrasulfide, bis(3-trimethoxysilylpropyl)tetrasulfide, bis(2-trimethoxysilylethyl)tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 3-trimethoxysilylpropylbenzothiazolyltetrasulfide, 3-triethoxysilylpropylbenzolyltetrasulfide, 3-triethoxysilylpropylmethacrylatemonosulfide, 3-trimethoxysilylpropylmethacrylatemonosulfide, bis(3-diethoxymethylsilylpropyl)tetrasulfide, 3-mercaptopropyldimethoxymethyl silane, dimethoxymethylsilylpropyl-N,N-dimethylthiocarbamoyltetrasulfide, dimethoxymethylsilylpropylbenzothiazolyltetrasulfide, or the like, and any one selected from the above-listed materials or a mixture of two or more of these materials may be used. Preferably, in consideration of improving reinforcement properties, the silane coupling agent may be bis(3-triethoxysilylpropyl)polysulfide or 3-trimethoxysilylpropylbenzothiazyltetrasulfide.

In addition, since the rubber composition according to one embodiment of the present invention uses the modified conjugated diene-based polymer in which a functional group with high affinity with silica is introduced into an active site thereof, as a rubber component, the amount of the silane coupling agent to be mixed therewith may be decreased as compared to a general case. Accordingly, the silane coupling agent may be used in an amount of 1 part by weight to 20 parts by weight, or 5 parts by weight to 15 parts by weight with respect to 100 parts by weight of silica. When the amount of the silane coupling agent is within the above range, an effect as a coupling agent may be sufficiently achieved and gelation of the rubber component may be prevented.

The rubber composition according to one embodiment of the present invention may be sulfur-crosslinkable, and may further include a vulcanizing agent. In particular, the vulcanizing agent may be sulfur powder, and may be included in an amount of 0.1 parts by weight to 10 parts by weight with respect to 100 parts by weight of the rubber component. When the amount of the vulcanizing agent is within the above range, elastic modulus and strength needed for a vulcanized rubber composition may be secured and high fuel efficiency may also be obtained.

The rubber composition according to one embodiment of the present invention may further include a variety of additives commonly used in the rubber industry, in particular, a vulcanization accelerator, process oil, a plasticizer, an antiaging agent, a scorch inhibitor, zinc white, stearic acid, thermosetting resin, thermoplastic resin, or the like, in addition to the above-listed components.

The vulcanization accelerator may be, for example, a thiazol-based compound such as 2-mercaptobenzothiazol (M), dibenzothiazyldisulfide (DM), N-cyclohexyl-2-benzothiazylsulfeneamide (CZ), or the like, or a guanidine-based compound such as diphenylguanidine (DPG) or the like. The vulcanization accelerator may be included in an amount of 0.1 parts by weight to 5 parts by weight with respect to 100 parts by weight of the rubber component.

The process oil acts as a softener in the rubber composition, and may be, for example, a paraffin-based compound, a naphthene-based compound, or an aromatic compound. An aromatic process oil may be used in consideration of tensile strength and wear resistance, and a naphthene- or paraffin-based process oil may be used in consideration of hysteresis loss and low-temperature properties. The process oil may be included, for example, in an amount of 100 parts by weight or less with respect to 100 parts by weight of the rubber component. When the amount of the process oil is within the above range, a decrease in tensile strength and deterioration of low exothermicity (low fuel efficiency) of the vulcanized rubber may be prevented.

The antiaging agent may be, for example, N-isopropyl-N'-phenyl-p-phenylenediamine, N-(1,3-dimethylbutyl)-N'-phenyl-p-phenylenediamine, 6-ethoxy-2,2,4-trimethyl-1,2-dihydroquinoline, a high-temperature condensed product of diphenylamine and acetone, or the like. The antiaging agent may be used in an amount of 0.1 parts by weight to 6 parts by weight with respect to 100 parts by weight of the rubber component.

The rubber composition according to one embodiment of the present invention may be obtained by kneading using a kneader such as a Banbury mixer, a roll, an internal mixer, or the like according to the mixing formulation, and a rubber composition with excellent low exothermicity and high wear resistance may be obtained by a vulcanizing process after molding processing.

Accordingly, the rubber composition may be usefully used in the manufacture of tire components such as tire treads, under treads, sidewalls, carcass-coated rubber, belt-coated rubber, bead fillers, chasers, bead-coated rubber, and the like, or in the manufacture of rubber products for various industries such as anti-vibration rubber, belt conveyors, hoses, and the like.

Furthermore, the present invention provides a tire manufactured using the above-described rubber composition.

The tire may include a tire or a tire tread.

Hereinafter, the present invention will be described in further detail with reference to the following examples. However, these examples are provided for illustrative purposes only and are not intended to limit the scope of the present invention.

PREPARATION EXAMPLES

Preparation Example 1: Preparation of Compound Represented by Formula 1-13

0.1 mol (14.91 g) of a compound represented by Formula 2-1 below was put into a 1 L round-bottom flask with a Schlenk line connected thereto, moisture was completely removed therefrom under reduced pressure, and then 500 ml of acetonitrile was added to the flask under an argon atmosphere. Then, 0.1 mol (42.57 g) of a compound represented by Formula 3-7 below and 10.12 g of triethylamine were added to the flask, followed by heating at 40° C. and stirring for 4 hours, to obtain a compound represented by Formula 1-13 below, and $^1$H and $^{13}$C nuclear magnetic resonance spectroscopic spectra thereof were observed.

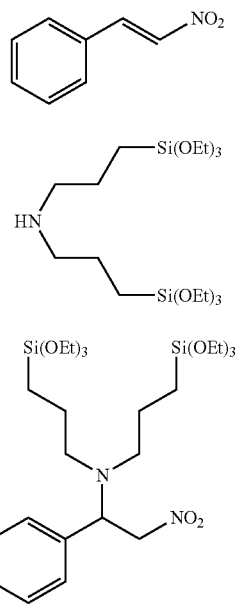

<Formula 2-1>

<Formula 3-7>

<Formula 1-13>

$^1$H NMR (CDCl$_3$, 500 MHz) δ 7.27-7.36 (m, 5H), 4.81 (d, 2H), 3.83-3.92 (m, 13H), 2.43 (m, 4H), 1.33 (m, 4H), 1.21 (t, 18H), 0.56 (t, 4H).

$^{13}$C NMR (CDCl$_3$, 500 MHz) δ 137.4, 128.8, 128.8, 128.4, 128.4, 127.2, 82.1, 64.7, 58.4, 58.4, 58.4, 58.4, 58.4, 58.4, 56.5, 56.5, 23.9, 23.9, 18.4, 18.4, 18.4, 18.4, 18.4, 18.4, 14.4, 14.4.

Preparation Example 2: Preparation of Compound Represented by Formula 1-14

0.1 mol (14.91 g) of the compound of Formula 2-1 was put into a 1 L round-bottom flask with a Schlenk line connected thereto, moisture was completely removed therefrom under reduced pressure, and then 0.1 mol (23.84 g) of a compound represented by Formula 3-10 below was added to the flask under an argon atmosphere, followed by stirring at 25° C. for 1 hour, to obtain a compound represented by Formula 1-14 below, and $^1$H and $^{13}$C nuclear magnetic resonance spectroscopic spectra thereof were observed.

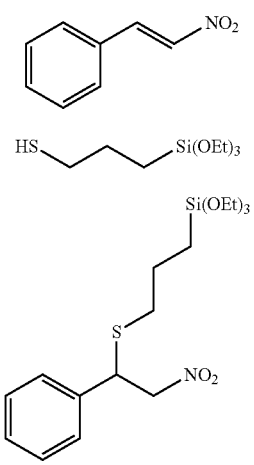

<Formula 2-1>

<Formula 3-10>

<Formula 1-14>

$^1$H NMR (CDCl$_3$, 500 MHz) δ 7.20-7.30 (m, 5H), 5.11 (d, 2H), 3.8-3.9 (m, 7H), 2.60 (m, 2H), 1.62 (m, 2H), 1.21 (t, 9H), 0.56 (t, 2H).

$^{13}$C NMR (CDCl$_3$, 500 MHz) δ 139.0, 128.7, 128.7, 128.6, 128.6, 84.4, 58.4, 58.4, 58.4, 41.1, 32.5, 18.4, 18.4, 18.4, 17.1, 15.6.

Preparation Example 3: Preparation of Compound Represented by Formula 1-15

A compound represented by Formula 1-15 below was prepared in the same manner as in Preparation Example 1, except that 0.1 mol (13.91 g) of a compound represented by Formula 2-3 below was put into a 1 L round-bottom flask with a Schlenk line connected thereto, instead of the compound of Formula 2-1, and $^1$H and $^{13}$C nuclear magnetic resonance spectroscopic spectra thereof were observed.

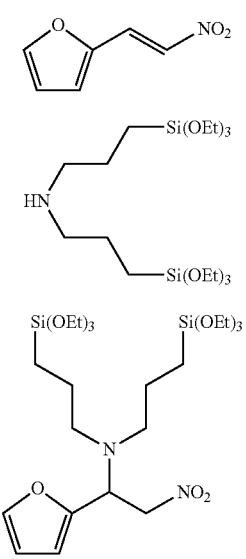

<Formula 2-3>

<Formula 3-7>

<Formula 1-15>

$^1$H NMR (CDCl$_3$, 500 MHz) δ 7.32 (m, 1H), 6.39-6.43 (m, 2H), 4.74-4.82 (m, 2H), 4.39 (t, 1H), 3.83-3.92 (m, 12H), 2.43 (m, 4H), 1.35 (m, 4H), 1.21 (t, 18H), 0.56 (t, 4H).

$^{13}$C NMR (CDCl$_3$, 500 MHz) δ 151.1, 141.5, 110.0, 109.2, 80.3, 65.9, 58.4, 58.4, 58.4, 58.4, 58.4, 58.4, 54.1, 54.1, 22.3, 22.3, 18.4, 18.4, 18.4, 18.4, 18.4, 18.4, 14.4, 14.4.

Preparation Example 4: Preparation of Compound Represented by Formula 1-16

A compound represented by Formula 1-16 was prepared in the same manner as in Preparation Example 2, except that 0.1 mol (13.91 g) of a compound represented by Formula 2-3 below was put into a 1 L round-bottom flask with a Schlenk line connected thereto, instead of the compound of Formula 2-1, and $^1$H and $^{13}$C nuclear magnetic resonance spectroscopic spectra thereof were observed.

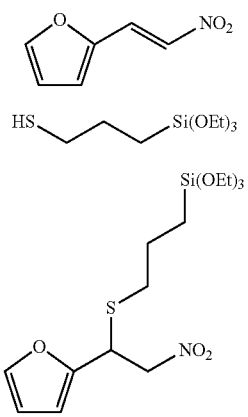

<Formula 2-3>

<Formula 3-10>

<Formula 1-16>

$^1$H NMR (CDCl$_3$, 500 MHz) δ 7.49 (d, 1H), 6.33 (t, 1H), 6.11 (d, 1H), 4.95-5.1 (m, 2H), 4.00 (m, 1H), 3.83 (m, 6H), 2.60 (m, 2H), 1.62 (m, 2H), 1.21 (t, 9H), 0.56 (t, 2H).
$^{13}$C NMR (CDCl$_3$, 500 MHz) δ 151.8, 141.5, 110.0, 107.2, 82.6, 58.4, 58.4, 58.4, 42.3, 30.1, 18.4, 18.4, 18.4, 16.5, 15.6.

Preparation Example 5: Preparation of Compound Represented by Formula 1-17

A compound represented by Formula 1-17 below was prepared in the same manner as in Preparation Example 1, except that 0.1 mol (16.32 g) of a compound represented by Formula 2-4 below was put into a 1 L round-bottom flask with a Schlenk line connected thereto, instead of the compound of Formula 2-1, and $^1$H and $^{13}$C nuclear magnetic resonance spectroscopic spectra thereof were observed.

<Formula 2-4>

<Formula 3-7>

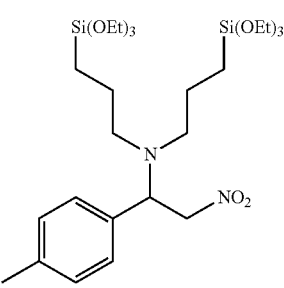

<Formula 1-17>

$^1$H NMR (CDCl$_3$, 500 MHz) δ 7.06-7.15 (m, 4H), 4.66-4.92 (m, 2H), 3.83-3.90 (m, 13H), 2.43 (m, 4H), 2.19 (s, 3H), 1.95 (m, 4H), 1.21 (t, 18H), 0.56 (t, 4H).
$^{13}$C NMR (CDCl$_3$, 500 MHz) δ 136.9, 134.4, 128.7, 128.7, 127.2, 127.2, 82.1, 64.7, 58.4, 58.4, 58.4, 58.4, 58.4, 58.4, 56.5, 56.5, 23.9, 23.9, 21.3, 18.4, 18.4, 18.4, 18.4, 18.4, 18.4, 14.4, 14.4.

Preparation Example 6: Preparation of Compound Represented by Formula 1-18

A compound represented by Formula 1-18 below was prepared in the same manner as in Preparation Example 2, except that 0.1 mol (16.32 g) of a compound represented by Formula 2-4 below was put into a 1 L round-bottom flask with a Schlenk line connected thereto, instead of the compound of Formula 2-1, and $^1$H and $^{13}$C nuclear magnetic resonance spectroscopic spectra thereof were observed.

<Formula 2-4>

<Formula 3-10>

<Formula 1-18>

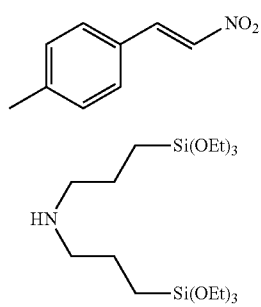

$^1$H NMR (CDCl$_3$, 500 MHz) δ 7.06-7.15 (m, 4H), 4.66-4.91 (m, 2H), 3.80-3.88 (m, 7H), 2.60 (m, 2H), 2.34 (s, 3H), 1.62 (m, 2H), 1.21 (t, 9H), 0.56 (t, 2H).
$^{13}$C NMR (CDCl$_3$, 500 MHz) δ 136.8, 136.0, 128.9, 128.9, 127.3, 127.3, 84.4, 58.4, 58.4, 58.4, 41.1, 32.5, 21.3, 18.4, 18.4, 18.4, 17.1, 15.6.

EXAMPLES

Example 1

270 g of styrene, 710 g of 1,3-butadiene, 5,000 g of n-hexane, and 0.9 g of ditetrahydrofurylpropane as a polar additive were put into a 20 L autoclave reactor, and then the temperature inside the reactor was raised to 40° C. When the temperature inside the reactor reached 40° C., 4.3 mmol of n-butyllithium was put into the reactor, and then an adiabatic heating reaction took place. After about 20 minutes from the adiabatic heating reaction being completed, 20 g of 1,3-butadiene was added so that the end of the polymer was capped with butadiene. After 5 minutes, 2.47 g (4.3 mmol) of the compound of Formula 1-13 prepared according to Preparation Example 1 was added to the reactor, and a reaction was allowed to occur for 15 minutes. Thereafter, the polymerization reaction was terminated using ethanol, and 45 ml of a solution prepared by dissolving 0.3 wt % butylated hydroxytoluene (BHT) as an antioxidant in hexane was added to the reactor. The resulting polymerized product was added to hot water heated with steam and stirred to remove the solvent therefrom, and then roll-dried to remove the remaining solvent and water, thereby completing the preparation of a modified conjugated diene-based polymer. Analysis results of the prepared modified conjugated diene-based polymer are shown in Table 1 below.

Example 2

A modified conjugated diene-based polymer was prepared in the same manner as in Example 1, except that 1.67 g (4.3 mmol) of the compound of Formula 1-14 prepared according to Preparation Example 2 was added instead of the compound of Formula 1-13 prepared according to Preparation Example 1.

Example 3

A modified conjugated diene-based polymer was prepared in the same manner as in Example 1, except that 2.42 g (4.3 mmol) of the compound of Formula 1-15 prepared according to Preparation Example 3 was added instead of the compound of Formula 1-13 prepared according to Preparation Example 1.

Example 4

A modified conjugated diene-based polymer was prepared in the same manner as in Example 1, except that 1.62 g (4.3 mmol) of the compound of Formula 1-16 prepared according to Preparation Example 4 was added instead of the compound of Formula 1-13 prepared according to Preparation Example 1.

Example 5

A modified conjugated diene-based polymer was prepared in the same manner as in Example 1, except that 2.53 g (4.3 mmol) of the compound of Formula 1-17 prepared according to Preparation Example 5 was added instead of the compound of Formula 1-13 prepared according to Preparation Example 1.

Example 6

A modified conjugated diene-based polymer was prepared in the same manner as in Example 1, except that 1.73 g (4.3 mmol) of the compound of Formula 1-18 prepared according to Preparation Example 6 was added instead of the compound of Formula 1-13 prepared according to Preparation Example 1.

Comparative Example 1

An unmodified conjugated diene-based polymer was prepared in the same manner as in Example 1, except that the compound of Formula 1-13 prepared according to Preparation Example 1 was not added.

Comparative Example 2

A modified conjugated diene-based polymer was prepared in the same manner as in Example 1, except that 1.63 g (4.3 mmol) of bis(diethoxymethylsilylpropyl)-N-methylamine was added instead of the compound of Formula 1-13 of Preparation Example 1.

Comparative Example 3

A modified conjugated diene-based polymer was prepared in the same manner as in Example 1, except that 2.30 g (4.3 mmol) of N,N-bis(triethoxysilylpropyl)aminopropyl-1-imidazole was added instead of the compound of Formula 1-13 of Preparation Example 1.

EXPERIMENTAL EXAMPLES

Experimental Example 1

A weight average molecular weight (Mw) ($\times 10^3$ g/mol), a number average molecular weight (Mn) ($\times 10^3$ g/mol), a molecular weight distribution (MWD), and a Mooney viscosity (MV) of each of the modified or unmodified conjugated diene-based polymers prepared according to examples and comparative examples were measured. The results thereof are shown in Table 1 below.

The Mw and the Mn were measured by gel permeation chromatography (GPC), and the MWD (Mw/Mn) was obtained by calculation from each of the measured molecular weights. In particular, the GPC was performed using, as a column, a combination of two PLgel Olexis columns (manufactured by Polymer Laboratories) and one PLgel mixed-C column (manufactured by Polymer Laboratories), all newly replaced columns were mixed bed-type columns, and polystyrene (PS) was used as a GPC standard material for the calculation of molecular weights.

The MV ((ML1+4, @ 100° C.) MU) was measured by MV-2000 (manufactured by ALPHA Technologies) at 100° C. using large Rotorfmf with a rotor speed of 2±0.02 rpm. At this time, samples used were maintained at room temperature (23±3° C.) for 30 minutes or more and 27±3 g of each sample was collected and filled into die cavities, and then the MV was measured using Platen for 4 minutes.

TABLE 1

| | Mw ($\times 10^3$ g/mol) | Mn ($\times 10^3$ g/mol) | MWD | MV |
|---|---|---|---|---|
| Example 1 | 566 | 391 | 1.4 | 90 |
| Example 2 | 456 | 317 | 1.4 | 69 |
| Example 3 | 566 | 392 | 1.4 | 90 |
| Example 4 | 455 | 315 | 1.4 | 68 |
| Example 5 | 559 | 388 | 1.4 | 91 |
| Example 6 | 459 | 317 | 1.4 | 69 |
| Comparative Example 1 | 258 | 239 | 1.1 | 43 |
| Comparative Example 2 | 390 | 301 | 1.3 | 68 |
| Comparative Example 3 | 553 | 384 | 1.4 | 88 |

Experimental Example 2

To comparatively analyze physical properties of a rubber composition including each of the modified or unmodified conjugated diene-based copolymers of the above examples and the above comparative examples and a molded product manufactured therefrom, tensile properties, wear resistance, and wet skid resistance thereof were measured, and the results thereof are shown in Table 3 below.

1) Preparation of Rubber Specimens

Each of the modified or unmodified styrene-butadiene copolymers of the examples and the comparative examples as raw rubber was mixed with other raw materials under mixing conditions shown in Table 2 below. In Table 2, the amounts of the raw materials are represented as parts by weight with respect to 100 parts by weight of rubber.

TABLE 2

|  | Raw materials | Amount (parts by weight) |
|---|---|---|
| Primary kneading | Raw rubber | 100 |
|  | Silica | 70 |
|  | Coupling agent | 11.2 |
|  | Process oil | 25 |
|  | Zinc white | 3 |
|  | Stearic acid | 2 |
|  | Antioxidant | 2 |
|  | Antiaging agent | 2 |
|  | wax | 1 |
|  | Rubber accelerator | 1.75 |
| Secondary kneading | Sulfur | 1.5 |
|  | Vulcanization accelerator | 2 |

In particular, each of the rubber specimens was kneaded through primary kneading and secondary kneading. In the primary kneading, the raw rubber (styrene-butadiene copolymer), a filler, an organosilane coupling agent, process oil, zinc white, stearic acid, an antioxidant, an antiaging agent, wax, and an accelerator were kneaded using a Banbury mixer equipped with a temperature controller. At this time, the temperature of the kneader was controlled and a primary mixture was obtained at a discharge temperature of 150° C. In the secondary kneading, the primary mixture was cooled to room temperature, and then the primary mixture, sulfur, and a vulcanization accelerator were added to the kneader and the resulting mixture was subjected to a curing process at 150° C. for 20 minutes, thereby completing the preparation of rubber specimens.

2) Tensile Properties

To evaluate tensile properties, each test piece was prepared in accordance with a tensile testing method of ASTM 412 and tensile strength of each test piece when cut and tensile stress (300% modulus) of each test piece at an elongation of 300% were measured. In particular, the tensile properties were measured at room temperature and a rate of 50 cm/min using Universal Test Machine 4204 (manufactured by INSTRON) as a tensile tester.

3) Wear Resistance

The wear resistance of each of the prepared rubber specimens was measured using a DIN abrader such that a load of 10 N was applied to a rotary drum with abrasive paper attached thereto, the rubber specimen was moved in a direction perpendicular to a rotation direction of the drum, and then a weight loss of the rubber specimen was measured, and the weight losses of the rubber specimens were indexed based on the weight loss of the case of Comparative Example 2. The rotary drum had a rotational speed of 40 rpm, and a total movement distance of the specimen when the test was completed was 40 m. A smaller index value of the weight loss indicates higher wear resistance.

4) Viscoelastic Properties

To evaluate viscoelastic properties, tan δ was measured using a dynamic mechanical analyzer (manufactured by TA) by varying deformation at a frequency of 10 Hz in a distortion mode and a measurement temperature (ranging from −60° C. to 60° C.). The Payne effect was represented by a difference between the minimum value and the maximum value in the deformation range of 0.28% to 40%. A higher value of tan δ at 0° C., which is a low temperature, indicates higher wet skid resistance, and a lower value of tan δ at 60° C., which is a high temperature, indicates lower hysteresis loss and lower driving resistance (higher fuel efficiency).

5) Vulcanization Properties

Vulcanization properties (t90) were evaluated by measuring MH (maximum torque) values and time (t90) taken up to 90% vulcanization when vulcanization was performed using a moving die rheometer (MDF) at 150° C. for 50 minutes.

TABLE 3

|  | Tensile properties | | Wear | Viscoelastic properties | | Vulcanization |
|---|---|---|---|---|---|---|
|  | 300% Modulus (kg · f/cm²) | Tensile strength (kg · f/cm²) | resistance Index | tan δ@0° C. | tan δ@60° C. | properties t90 (minutes) |
| Example 1 | 155 | 177 | 99 | 1.123 | 0.094 | 21.5 |
| Example 2 | 154 | 175 | 99 | 1.126 | 0.099 | 21.6 |
| Example 3 | 155 | 177 | 100 | 1.135 | 0.089 | 21.9 |
| Example 4 | 156 | 176 | 100 | 1.139 | 0.091 | 21.8 |
| Example 5 | 155 | 176 | 101 | 1.122 | 0.095 | 21.7 |
| Example 6 | 154 | 177 | 99 | 1.125 | 0.100 | 21.5 |
| Comparative Example 1 | 121 | 148 | 90 | 0.801 | 0.131 | 22.0 |
| Comparative Example 2 | 151 | 177 | 100 | 0.998 | 0.108 | 21.7 |
| Comparative Example 3 | 156 | 174 | 99 | 1.003 | 0.109 | 21.9 |

As shown in Table 3, it was confirmed that the modified conjugated diene-based polymers of the Examples modified using the modifiers according to the present invention exhibited excellent tensile properties, high wear resistance, excellent viscoelastic properties, and excellent vulcanization properties.

In particular, the modified conjugated diene-based polymers of the Examples modified using the modifiers according to the present invention contain a nitro group, and thus exhibit very high dispersibility via hydrogen bonding with an inorganic filler when mixed therewith, and, accordingly, the tensile properties, wear resistance, and viscoelastic properties of the cases of the Examples were significantly improved compared to those of the unmodified conjugated diene-based polymer of Comparative Example 1. In addition, it was confirmed that, when compared to the cases of Comparative Examples 2 and 3 that were modified using an alkoxysilane-based modifier containing nitrogen atoms such as an amine group, an imidazole group, or the like, but excluding a nitro group, the cases of the Examples exhibited significantly improved viscoelastic properties, resulting in very high wet skid resistance and very low driving resistance.

The invention claimed is:

1. A modifier comprising a compound represented by Formula 1:

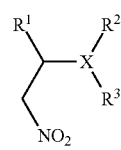

<Formula 1> wherein, in Formula 1, $R^1$ is deuterium, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, or a substituted or unsubstituted $C_3$-$C_{30}$ heterocyclic group, $R^2$ is deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1a below, $R^3$ is deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1b below, wherein, when $R^1$, $R^2$, and $R^3$ are the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group, a substituent of the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group comprises one or more selected from the group consisting of deuterium, a halogen, a hydroxyl group, a nitro group, a cyano group, a $C_1$-$C_{30}$ alkyl group, a $C_1$-$C_{30}$ alkylsilyl group, a $C_2$-$C_{30}$ alkenyl group, a $C_2$-$C_{30}$ alkynyl group, a $C_1$-$C_{30}$ alkoxy group, a substituted or unsubstituted $C_1$-$C_{30}$ heteroalkyl group, a $C_5$-$C_{30}$ cycloalkyl group, a $C_6$-$C_{30}$ aryl group, and a $C_3$-$C_{30}$ heterocyclic group, and X is one heteroatom selected from the group consisting of nitrogen (N), oxygen (O), and sulfur (S), wherein, when X is N, at least one of $R^2$ and $R^3$ is necessarily the functional group of Formula 1a or 1b, and when X is O or S, only one of the $R^2$ and $R^3$ functional groups is present, wherein, when $R^2$ is present, $R^2$ is the functional group of Formula 1a, and, when $R^3$ is present, $R^3$ is the functional group of Formula 1b,

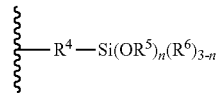

<Formula 1a>

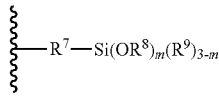

<Formula 1b> wherein, in Formulae 1a and 1b, $R^4$ and $R^7$ are each independently a $C_1$-$C_{10}$ alkylene group, $R^5$, $R^6$, $R^8$, and $R^9$ are each independently a $C_1$-$C_{30}$ alkyl group, a $C_5$-$C_{30}$ cycloalkyl group, or a $C_6$-$C_{30}$ aryl group, m and n are each independently an integer selected from 0, 1, 2, and 3, wherein m+n≥1, and when only one of the functional groups of Formulae 1a and 1b is present, m or n is each independently an integer selected from 1, 2, and 3, and when X is S and $R^1$ is $C_6$ aryl group, $R^4$ and $R^7$ are each independently a $C_5$-$C_{10}$ alkylene group.

2. The modifier of claim 1, wherein, in Formula 1, $R^1$ is a substituted or unsubstituted $C_1$-$C_{20}$ alkyl group, a substituted or unsubstituted $C_2$-$C_{20}$ alkenyl group, a substituted or unsubstituted $C_2$-$C_{20}$ alkynyl group, a substituted or unsubstituted $C_1$-$C_{20}$ heteroalkyl group, a substituted or unsubstituted $C_5$-$C_{20}$ cycloalkyl group, a substituted or unsubstituted $C_6$-$C_{20}$ aryl group, or a substituted or unsubstituted $C_3$-$C_{20}$ heterocyclic group, $R^2$ is the functional group of Formula 1a, $R^3$ is the functional group of Formula 1b, wherein, when $R^1$ is the substituted alkyl group, the substituted alkenyl group, the substituted alkynyl group, the substituted heteroalkyl group, the substituted cycloalkyl group, the substituted aryl group, or the substituted heterocyclic group, a substituent of the substituted alkyl group, the substituted alkenyl group, the substituted alkynyl group, the substituted heteroalkyl group, the substituted cycloalkyl group, the substituted aryl group, or the substituted heterocyclic group comprises one or more selected from the group consisting of deuterium, a halogen, a hydroxyl group, a nitro group, a cyano group, a $C_1$-$C_{30}$ alkyl group, a $C_1$-$C_{30}$ alkylsilyl group, a $C_2$-$C_{30}$ alkenyl group, a $C_2$-$C_{30}$ alkynyl group, a $C_1$-$C_{30}$ alkoxy group, a substituted or unsubstituted $C_1$-$C_{30}$ heteroalkyl group, a $C_5$-$C_{30}$ cycloalkyl group, a $C_6$-$C_{30}$ aryl group, and a $C_3$-$C_{30}$ heterocyclic group, and X is one heteroatom selected from the group consisting of N, O, and S, wherein, when X is O or S, only one of the $R^2$ and $R^3$ functional groups is present, and, in Formulae 1a and 1b, $R^5$, $R^6$, $R^8$, and $R^9$ are each independently a $C_1$-$C_{20}$ alkyl group, a $C_5$-$C_{20}$ cycloalkyl group, or a $C_6$-$C_{20}$ aryl group, and m and n are each independently an integer selected from 1, 2, and 3, and when X is S and $R^1$ is $C_6$ aryl group, $R^4$ and $R^7$ are each independently a $C_5$-$C_{10}$ alkylene group.

3. The modifier of claim 1, wherein the compound of Formula 1 is one selected from the group consisting of compounds represented by Formulae 1-1, 1-3, 1-5, 1-6, 1-7, 1-9 and 1-11 below:

<Formula 1-1>

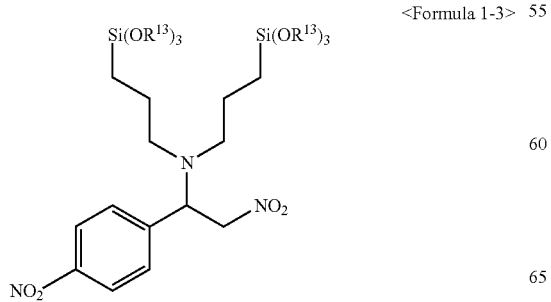

<Formula 1-2>

<Formula 1-3>

<Formula 1-4>

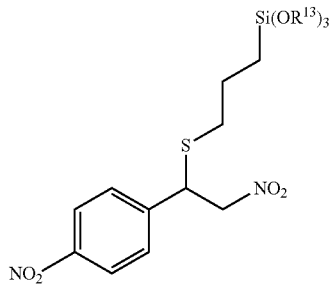

<Formula 1-5>

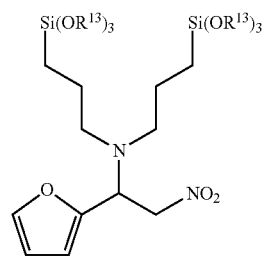

<Formula 1-6>

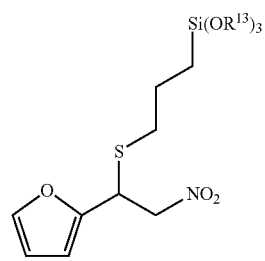

<Formula 1-7>

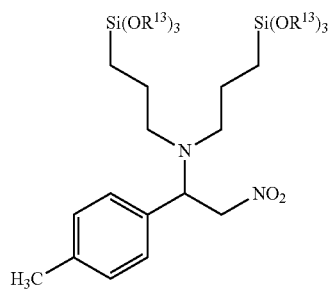

<Formula 1-8>

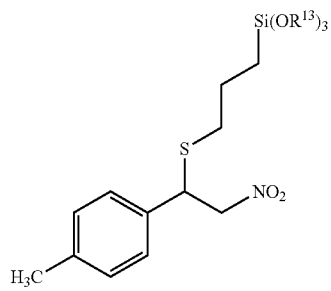

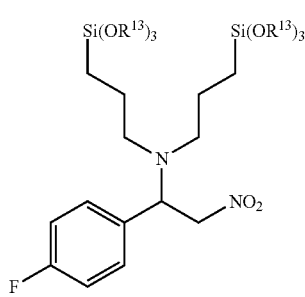

<Formula 1-9>

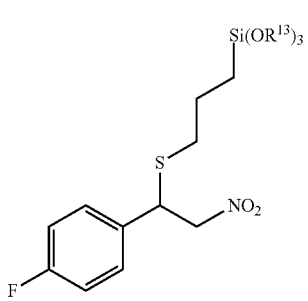

<Formula 1-10>

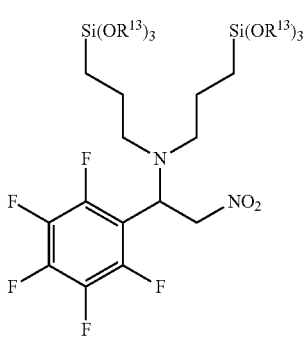

<Formula 1-11>

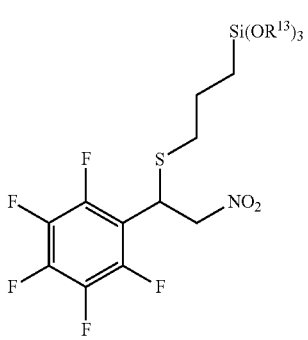

<Formula 1-12> wherein, in Formulae 1-1, 1-3, 1-5, 1-6, 1-7, 1-9 and 1-11, $R^{13}$ is a $C_1$-$C_{20}$ alkyl group.

4. The modifier of claim 3, wherein $R^{13}$ is an ethyl group or a methyl group.

5. A method of preparing the modifier of claim 1, the method comprising reacting a compound represented by Formula 2 below with a compound represented by Formula 3 below:

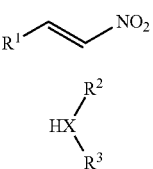

<Formula 2>

<Formula 3>

$$HX\begin{matrix}R^2\\R^3\end{matrix}$$

wherein, in Formulae 2 and 3, $R^1$ is deuterium, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, or a substituted or unsubstituted $C_3$-$C_{30}$ heterocyclic group, $R^2$ is deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1a below, $R^3$ is deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1b below, wherein, when $R^1$, $R^2$, and $R^3$ are the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group, a substituent of the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group comprises one or more selected from the group consisting of deuterium, a halogen, a hydroxyl group, a nitro group, a cyano group, a $C_1$-$C_{30}$ alkyl group, a $C_1$-$C_{30}$ alkylsilyl group, a $C_2$-$C_{30}$ alkenyl group, a $C_2$-$C_{30}$ alkynyl group, a $C_1$-$C_{30}$ alkoxy group, a substituted or unsubstituted $C_1$-$C_{30}$ heteroalkyl group, a $C_5$-$C_{30}$ cycloalkyl group, a $C_6$-$C_{30}$ aryl group, and a $C_3$-$C_{30}$ heterocyclic group, and X is one heteroatom selected from the group consisting of nitrogen (N), oxygen (O), and sulfur (S), wherein, when X is N, at least one of $R^2$ and $R^3$ is necessarily the functional group of Formula 1a or 1b, and when X is O or S, only one of the $R^2$ and $R^3$ functional groups is present, wherein, when $R^2$ is present, $R^2$ is the functional group of Formula 1a, and, when $R^3$ is present, $R^3$ is the functional group of Formula 1b,

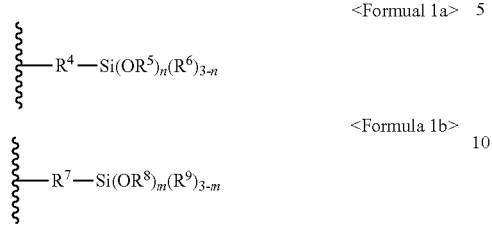

<Formula 1a>

<Formula 1b> wherein, in Formulae 1a and 1b, $R^4$ and $R^7$ are each independently a $C_1$-$C_{10}$ alkylene group, $R^5$, $R^6$, $R^8$, and $R^9$ are each independently a $C_1$-$C_{30}$ alkyl group, a $C_5$-$C_{30}$ cycloalkyl group, or a $C_6$-$C_{30}$ aryl group, m and n are each independently an integer selected from 0, 1, 2, and 3, wherein m+n≥1, and when only one of the functional groups of Formulae 1a and 1b is present, m or n is each independently an integer selected from 1, 2, and 3, and when X is S and $R^1$ is $C_6$ aryl group, $R^4$ and $R^7$ are each independently a $C_5$-$C_{10}$ alkylene group.

6. The method of claim 5, wherein a molar ratio (Formula 2:Formula 3) of the compound of Formula 2 to the compound of Formula 3 is 1:0.5 to 2.

7. The method of claim 5, wherein the reacting is performed at a reaction temperature of 10° C. to 90° C.

8. The method of claim 5, wherein the reacting is performed in the presence of a basic compound.

9. The method of claim 8, wherein the basic compound comprises one or more selected from the group consisting of methylamine, dimethylamine, triethylamine, tetramethylethylenediamine, lithiumdiisopropylamide, 1,8-diazabicycloundec-7-ene, 2,6-di-tert-butylpyridine, and lithiumtetramethylpiperidine.

10. A modified conjugated diene-based polymer comprising a repeating unit derived from a conjugated diene-based monomer and, at one terminal thereof, a functional group derived from a modifier comprising a compound represented by Formula 1 below:

<Formula 1> wherein, in Formula 1, $R^1$ is deuterium, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, or a substituted or unsubstituted $C_3$-$C_{30}$ heterocyclic group, $R^2$ is deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1a below, $R^3$ is deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1b below, wherein, when $R^1$, $R^2$, and $R^3$ are the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group, a substituent of the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group comprises one or more selected from the group consisting of deuterium, a halogen, a hydroxyl group, a nitro group, a cyano group, a $C_1$-$C_{30}$ alkyl group, a $C_1$-$C_{30}$ alkylsilyl group, a $C_2$-$C_{30}$ alkenyl group, a $C_2$-$C_{30}$ alkynyl group, a $C_1$-$C_{30}$ alkoxy group, a substituted or unsubstituted $C_1$-$C_{30}$ heteroalkyl group, a $C_5$-$C_{30}$ cycloalkyl group, a $C_6$-$C_{30}$ aryl group, and a $C_3$-$C_{30}$ heterocyclic group, and X is one heteroatom selected from the group consisting of nitrogen (N), oxygen (O), and sulfur (S), wherein, when X is N, at least one of $R^2$ and $R^3$ is necessarily the functional group of Formula 1a or 1b, and when X is O or S, only one of the $R^2$ and $R^3$ functional groups is present, wherein, when $R^2$ is present, $R^2$ is the functional group of Formula 1a, and, when $R^3$ is present, $R^3$ is the functional group of Formula 1b,

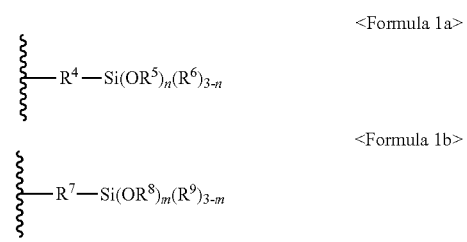

<Formula 1a>

<Formula 1b> wherein, in Formulae 1a and 1b, $R^4$ and $R^7$ are each independently a $C_1$-$C_{10}$ alkylene group, $R^5$, $R^6$, $R^8$, and $R^9$ are each independently a $C_1$-$C_{30}$ alkyl group, a $C_5$-$C_{30}$ cycloalkyl group, or a $C_6$-$C_{30}$ aryl group, m and n are each independently an integer selected from 0, 1, 2, and 3, wherein m+n≥1, and when only one of the functional groups of Formulae 1a and 1b is present, m or n is each independently an integer selected from 1, 2, and 3, and when X is S and $R^1$ is $C_6$ aryl group, $R^4$ and $R^7$ are each independently a $C_5$-$C_{10}$ alkylene group.

11. The modified conjugated diene-based polymer of claim 10, further comprising a repeating unit derived from an aromatic vinyl monomer.

12. The modified conjugated diene-based polymer of claim 10, wherein the modified conjugated diene-based polymer has a number average molecular weight (Mn) of 10,000 g/mol to 2,000,000 g/mol.

13. The modified conjugated diene-based polymer of claim 10, wherein the modified conjugated diene-based polymer has a molecular weight distribution (Mw/Mn) of 1.0 to 8.0.

14. A modified conjugated diene-based polymer comprising a repeating unit derived from a conjugated diene-based monomer and, at one terminal thereof, a functional group derived from a modifier comprising a compound represented by Formula 1 below and, at another terminal thereof, a functional group derived from a modification initiator represented by Formula 4 below:

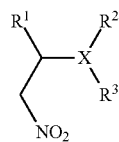

<Formula 1> wherein, in Formula 1, $R^1$ is deuterium, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, or a substituted or unsubstituted $C_3$-$C_{30}$ heterocyclic group, $R^2$ is deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1a below, $R^3$ is deuterium, a substituted or unsubstituted $C_1$-$C_{30}$ alkyl group, a substituted or unsubstituted $C_1$-$C_{30}$ alkylsilyl group, a substituted or unsubstituted $C_2$-$C_{30}$ alkenyl group, a substituted or unsubstituted $C_2$-$C_{30}$ alkynyl group, a substituted or unsubstituted $C_1$-$C_{30}$ alkoxy group, a substituted or unsubstituted $C_1$-$C_{30}$ heteroalkyl group, a substituted or unsubstituted $C_5$-$C_{30}$ cycloalkyl group, a substituted or unsubstituted $C_6$-$C_{30}$ aryl group, a substituted or unsubstituted $C_3$-$C_{30}$ heterocyclic group, or a functional group represented by Formula 1b below, wherein, when $R^1$, $R^2$, and $R^3$ are the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group, a substituent of the substituted alkyl group, the substituted alkylsilyl group, the substituted alkenyl group, the substituted alkynyl group, the substituted alkoxy group, the substituted heteroalkyl group, the substituted cycloalkyl group, the substituted aryl group, or the substituted heterocyclic group comprises one or more selected from the group consisting of deuterium, a halogen, a hydroxyl group, a nitro group, a cyano group, a $C_1$-$C_{30}$ alkyl group, a $C_1$-$C_{30}$ alkylsilyl group, a $C_2$-$C_{30}$ alkenyl group, a $C_2$-$C_{30}$ alkynyl group, a $C_1$-$C_{30}$ alkoxy group, a substituted or unsubstituted $C_1$-$C_{30}$ heteroalkyl group, a $C_5$-$C_{30}$ cycloalkyl group, a $C_6$-$C_{30}$ aryl group, and a $C_3$-$C_{30}$ heterocyclic group, and X is one heteroatom selected from the group consisting of nitrogen (N), oxygen (O), and sulfur (S), wherein, when X is N, at least one of $R^2$ and $R^3$ is necessarily the functional group of Formula 1a or 1b, and when X is O or S, only one of the $R^2$ and $R^3$ functional groups is present, wherein, when $R^2$ is present, $R^2$ is the functional group of Formula 1a, and, when $R^3$ is present, $R^3$ is the functional group of Formula 1b,

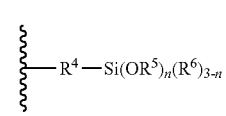

<Formula 1a>

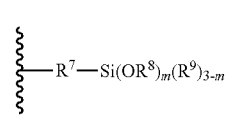

<Formula 1b> wherein, in Formulae 1a and 1b, $R^4$ and $R^7$ are each independently a $C_1$-$C_{10}$ alkylene group, $R^5$, $R^6$, $R^8$, and $R^9$ are each independently a $C_1$-$C_{30}$ alkyl group, a $C_5$-$C_{30}$ cycloalkyl group, or a $C_6$-$C_{30}$ aryl group, m and n are each independently an integer selected from 0, 1, 2, and 3, wherein m+n≥1, and when only one of the functional groups of Formulae 1a and 1b is present, m or n is each independently an integer selected from 1, 2, and 3, and when X is S and $R^1$ is $C_6$ aryl group, $R^4$ and $R^7$ are each independently a $C_5$-$C_{10}$ alkylene group,

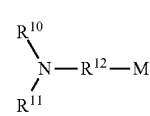

<Formula 4> wherein, in Formula 4, $R^{10}$ and $R^{11}$ are each independently one selected from the group consisting of a $C_1$-$C_{20}$ alkyl group, a $C_3$-$C_{20}$ cycloalkyl group, and a $C_6$-$C_{20}$ aralkyl group, or are linked to each other to form a saturated or unsaturated cyclic structure with 5 to 20 carbon atoms together with neighboring N atom, wherein, when forming the cyclic structure, $R^{10}$ and $R^{11}$ optionally have a branched structure, $R^{12}$ is a single bond, a $C_1$-$C_{20}$ alkylene group, or one selected from the group consisting of linkers represented by Formulae 5 to 7 below, and M is an alkali metal.

<Formula 5>

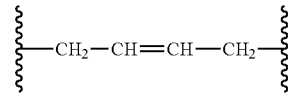

<Formula 6>

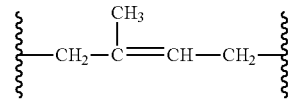

<Formula 7>

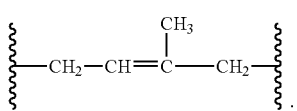

15. The modified conjugated diene-based polymer of claim 14, further comprising a repeating unit derived from an aromatic vinyl monomer.

16. The modified conjugated diene-based polymer of claim 14, wherein the modified conjugated diene-based polymer has a number average molecular weight (Mn) of 10,000 g/mol to 2,000,000 g/mol.

17. The modified conjugated diene-based polymer of claim 14, wherein the modified conjugated diene-based polymer has a molecular weight distribution (Mw/Mn) of 1.0 to 8.0.

* * * * *